United States Patent [19]

Yaoxin et al.

[11] Patent Number: 4,749,486

[45] Date of Patent: Jun. 7, 1988

[54] AUTOMATIC LATERAL FILTRATION-TYPE CENTRIFUGE

[75] Inventors: Cheng Yaoxin; Gui Dongsheng; Yang Chuanzhi; Shou Guobao, all of Hunan, China

[73] Assignee: Zhongnan Factory of Pharmaceutical Machinery, Qiyang County, Hunan, China

[21] Appl. No.: 843,088

[22] Filed: Mar. 24, 1986

[30] Foreign Application Priority Data

Apr. 1, 1985 [CN] China ................................ 85100169

[51] Int. Cl.[4] ............................................ B01D 17/038

[52] U.S. Cl. .................................... 210/361; 210/370; 210/371; 210/374; 210/376

[58] Field of Search .................. 210/360.1, 360.2, 361, 210/369, 370, 371, 372, 374, 376, 541, 542

[56] References Cited

FOREIGN PATENT DOCUMENTS 33066 2/1934 Netherlands ........................ 210/376

*Primary Examiner*—Frank Sever

*Attorney, Agent, or Firm*—Ladas & Parry

[57] ABSTRACT

An automatic centrifugal machine with lateral filtration used for realizing a highly effective separation of hardly separable fine sticky solid particles. It is equipped with a rotatable sediment drum having a radial filter plate, infrared fluid level monitor device, microcomputer programme control system as well as installations for hydraulic drive, automatic speed adjustment, automatic washing and discharge etc. That can realize a lateral filtration without filter cakes, thus attaining the object of a highly effective separation, complete discharge, undestroyed crystals, filter media easily regenerated and an operation of automation. It is especially suitable for the work of taking measures against poisoning, explosionproof and radiationproof.

6 Claims, 4 Drawing Sheets

AUTOMATIC LATERAL FILTRATION-TYPE CENTRIFUGE

The present invention relates to an automatic lateral filtration-type centrifuge used for realizing a highly effective separation of hardly separable fine stickly solid particles.

The highly effective separation of fine sticky solid particles is a technique more difficult. At present it can be performed on conventional sediment-type centrifuges such as WL Type Centrifuge, however, the filter cakes after separation contain much moisture, therefore post-treatment is necessary for lowering the humidity of filter cakes. Conventional filtration centrifuges such as those of Types SS, SX, WG etc. are simply not suitable for the separation of fine sticky solid particles, because the filter resistance increases gradually as soon as the filter cake is progressively formed, thickened, and compacted on the filter medium, so that the velocity of filtration decreases very quickly. Moreover, the centrifutges like SX and WG Types unload with scrapers, which may cause the destruction of crystals. The most important is that the discharge is incomplete, as each cycle is finished, a layer of filter cakes is remained on the filter media, so the next circulation can not operate rapidly. FO Type Filter Centrifuge, West Germany Pat. No. 1911147, is designed for separating fine sticky solid particles, still it follows the principles of conventional centrifuges, and also the problem remains unsolved that the filtration speed decreases rapidly when the filter cakes formed gradually on the filter medium. It adopts only a newer unloading manner, that is, after the separation is completed, the revolving drum moves axially twice as long as itself, and turns the filter medium over 180 degrees, the material is discharged by its own centrifugal or inertial force during operation at low speed. Nevertheless, due to the fact that the drum at discharge must move axially twice its length, and there are such drawbacks as uncompacted structure and a greater space occupied. At the same time, the drum may be destroyed owing to fatigue for its filter medium turns over frequently. It should be regularly replaced.

In view of the above-mentioned technical disadvantages, the object of the present invention is to provide an automatic centrifuge lateral filtration-type that is extremely automatic, used for high-effective separation of fine sticky solid particles.

The task of the present invention is settled by the solution corresponding to the characterizing part according to claim 1.

A set of radial filter plates perpendicular to the level of drum bottom are put in a cylindrical sediment drum (see A—A sectional drawing), which permits the filtration of suspensions containing fine sticky solid particles in the process of centrifugal separation, while the solid particles are centrifugally sedimentated on the drum without perforations, the filtrate, under the centrifugal pressure, is filtered off from a radial filter plate, along the direction perpendicular to the movement of solid particles, thus realizing basically a lateral filtration without filter cake. In the process of conventional filtration of fine sticky solid particles, the main resistance of filtration depends on filter cake, but in the process of lateral filtration, the filtrate may be substantially on the whole filtered out under a condition without resistance of filter cake, whereby the speed of filtration is greatly augmented, and due to both sides of the radial filter plate are surfaces of filtration, the area of lateral filtration centrifuge is increased by several times as large as that of the conventional filtration centrifuge so the efficiency of lateral filtration is raised.

After separation, the solid particles sedimentated between the interior of the drum and the radial filter plates are emptied through a special pushing device controlled by a hydraulic system, pushed the filter plates out of the drum together with the solid particles and permitting it to whirl at low speed. Solid particles are discharged from radial filter plates by means of its own centrifugal or inertial force. This manner of automatic discharge will not cause the destruction of crystals, and it is convenient for the regeneration of filter medium, and enables the next circulation maintain the primary speed of filtration.

The automatic harmonium feeding device consists of an overflow pipe, a circular fluid receiver, a fluid discharger, a transparent pipe, a feeder valve, an infrared sensor and a microcomputer. When the suspensions to be filtrated are added to the positional radius of the overflow pipe, they flow from the overflow pipe into the circular fluid receiver, and enter into the transparent pipe by way of fluid discharger, while infrared sensor is induced to give signals, microcomputer is ordered to shut the feeder valve at once and to stop feeding. When circular radius of the suspensions is greater than the positional radius of the overflow pipe, the infrared sensor immediately orders the microcomputer to open the feeder valve and to continue to feed. It is in this manner until a circle is completed, thus realizing an automatic harmonius feeding.

Compared with the prior art, the present invention has such advantages as high-effective separation, complete discharge, filter media easy to be regenerated, automation to a greater extent, compact structure, so a separated operation is put into effect. The present invention is especially suitable for taking measures against poisoning, explosionproof and radiation-proof.

Figure 1:
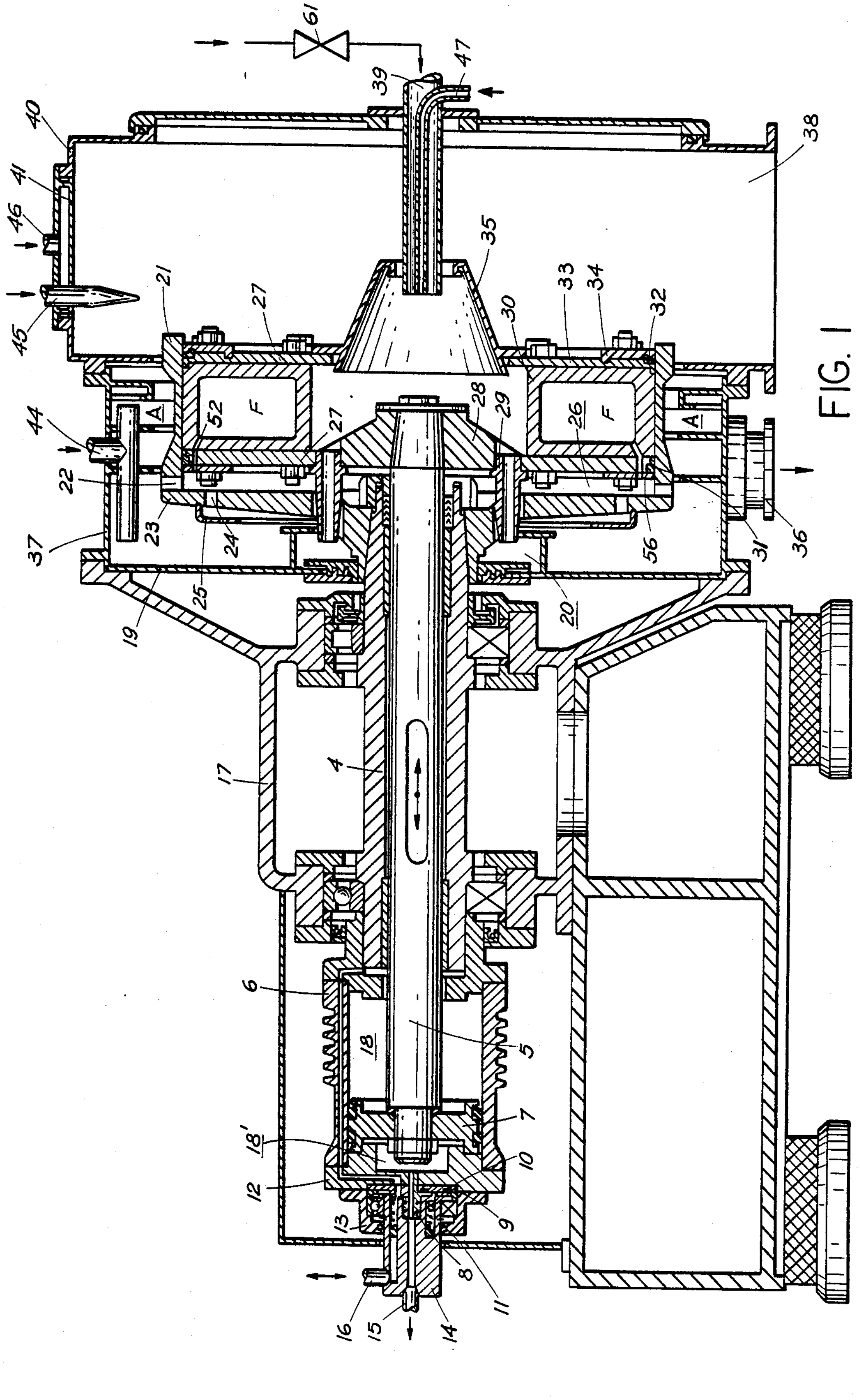
FIG. 1 is an axial cross-sectional view of a centrifuge.
Figure 2:
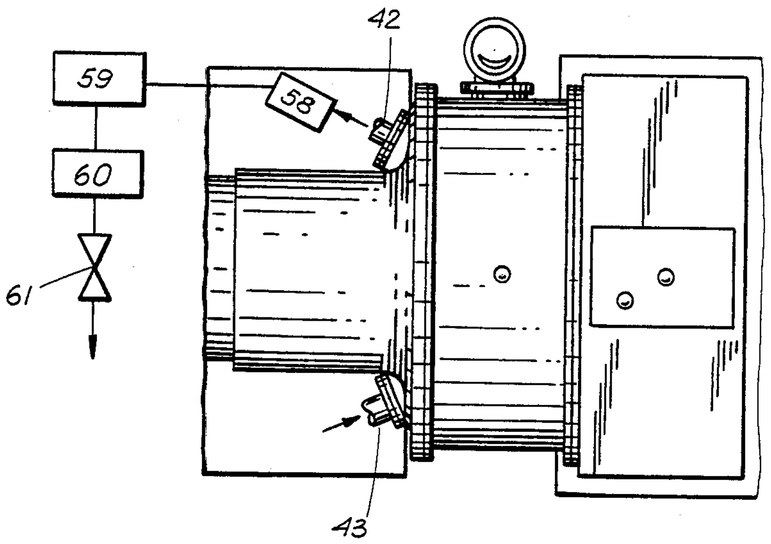
FIG. 2 is a partial top view of a centrifuge, and a drawing of the feeding contral system.

The following is a more detailed description of the present invention along with its accompanying drawings.

In the figure, the horizontal hollow main shaft (4) is located in the bearing base (17), its left side is merged with cylinder (6) into an integral whole, so is the right side with rotatable drum (21). The drum (21) is a cylindrical sedimentation rotatable drum. At the joint of the drum bottom (23) and drum (21), the holes (22) are evenly perforated along the whole perimeter of the cylindrical drum, so the filtrate may be discharged from here. At the drum bottom, axial orifices (24) are evenly made along a circle with definite diameter, thus the detergent may enter from here. The drum is provided with a set of pushing disks (27) and a distribution funnel (35). The pusher (5) in the hollow axle shaft (4), and piston (7), on the left side from (4), the set of pushing disks (27) on the right side from (4) and the distribution funnel (35) are merged into an whole. Piston (7) divides cylinder (6) into two parts: a left chamber (18') and a right chamber (18). The pushing disk (28) and the drum bottom (23) restrict the annular chamber (26). A set of pushing disks (27) is composed of pushing disk (28), pressed plate (56), radial filter plate (F), seal ring (31, 32), fluid fender (33) and pressed plate (34).

Figure 3:
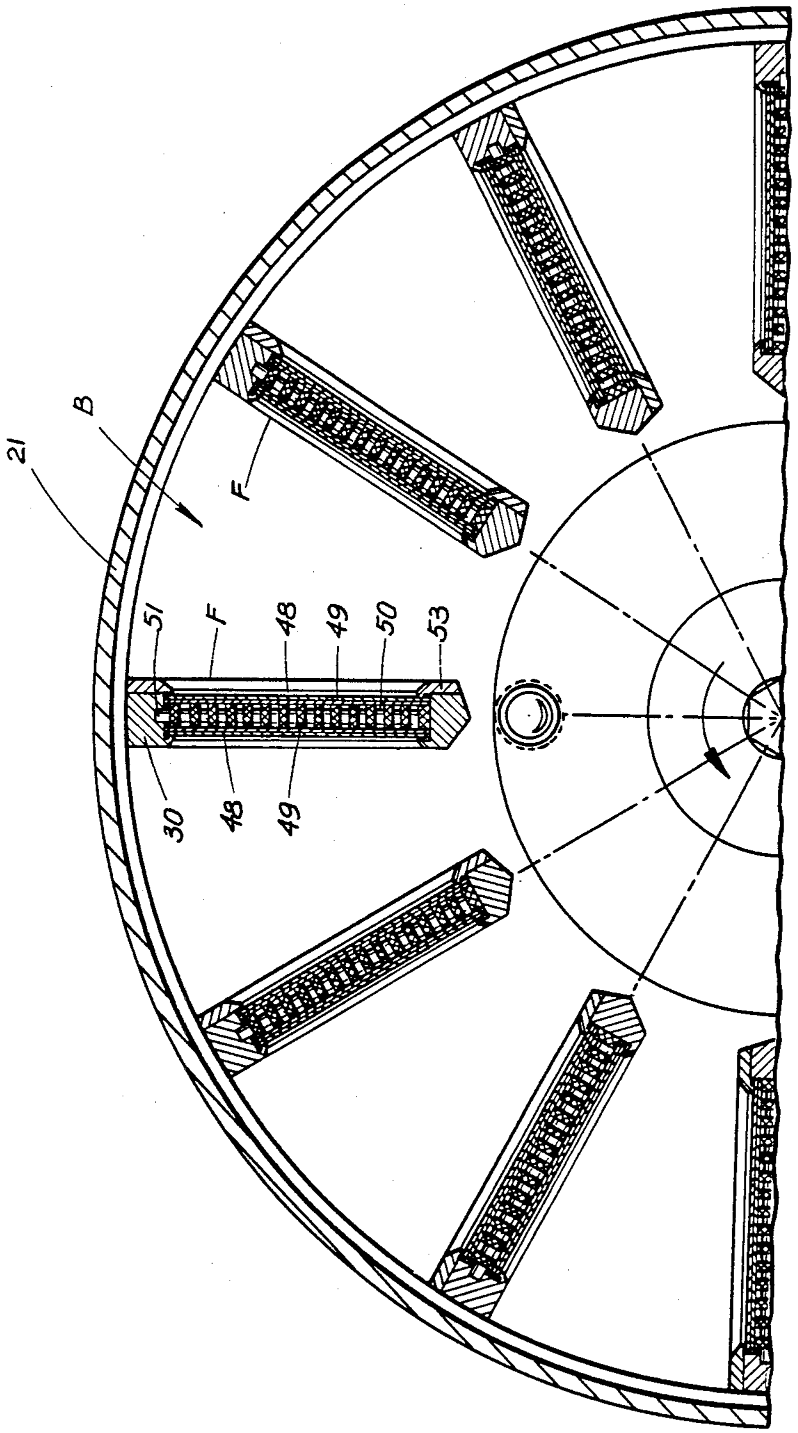
FIG. 3 is a cutaway view of the centrifuge.
Figure 4:
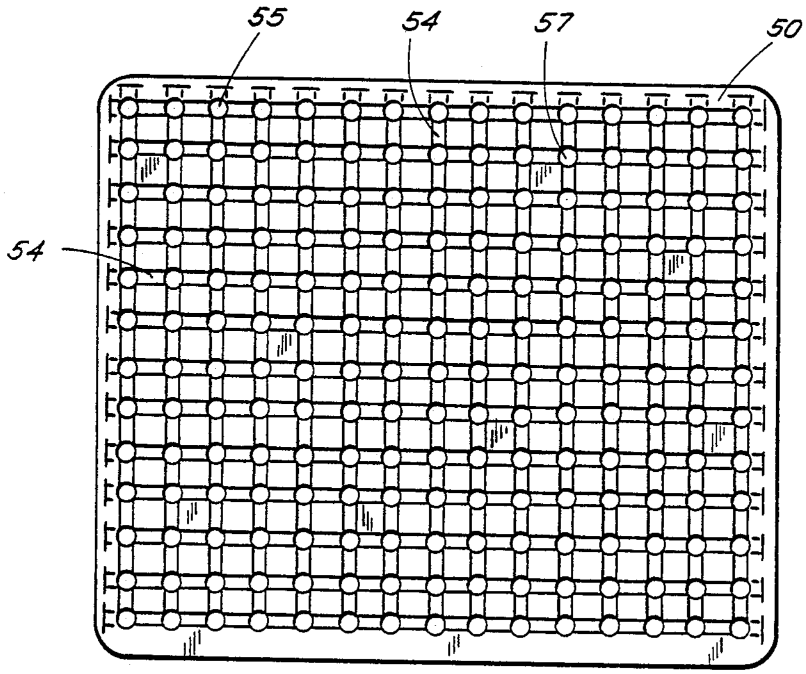
FIG. 4 shows the structure of the slotted hole plate.
Figure 6:
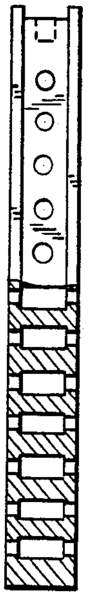
FIG. 6 is a partial section of the side view of the slotted hole plate of FIG. 4.
Figure 7:
FIG. 7 is a cross section of the sieve of FIG. 5.
Figure 5:
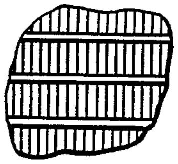
FIG. 5 is a schematic diagram of the sieve.

Both sides of the filter plate (F) of the present invention are surfaces of filtration, and consist of a filter pipe body (30, a slotted hole plate (50), a sieve (49), filter cloth (48) and gland (53) as shown in FIGS. 3, 4. Slotted hole plate (50) is made of F-4 material, on which vertically and horizontally crossed guide slots (54) are evenly distributed, in the crossing place of the guide slots perforations (57) are made (as shown in FIG. 4 in order to dredge the filtrate to flow out easily and smoothly. The sieve (49) adopts a shutter form (as shown in FIG. 5), and it has a higher mechanical strength as compared with that of common punched hole sieve. The convex of the shutter is closely linked with the slotted hole plate (50), so as to make the filtrate flow fluently. It is inconventient to change filter cloth (48), for it can be selected according to varying suspensions.

The left side of cylinder (6) is equipped with a special mechanical seal device, consisting of movable ring (9), static ring (8,10), spring (11), bearing (12), bearing bridge (13), sealing box (14) and joints (15,16). The sealing box (14) is fixed on the base of machine (3) by means of a support means (not shown in the FIG.). When main shaft (4) and pusher (5) rotate synchronically, static ring (8,10), spring (11) and sealing box (14) remain unmoved, thereby a sealing effect is reached.

In normal operation, the hydraulic oil starts firstly the oil motor (not shown in the FIG.). The cylinder (6) whirls with the aid of belt transmission from the hydraulic motor. While adjusting the oil supply, the speed of the motor can be varied, so the speed of revolving drum may be regulated. Meantime, a small amount of pressured oil enters through the joint (16) into the right chamber cylinder (18), causing the piston (7) not moved to the right side and maintain in the position as shown in FIG. 1. Feeding begins when the rotatable drum attains to a whole or middle speeds, and it is accomplished by feeder valve (61), infrared sensor (59) and a control system of microcomputer (60). The suspension passes through the feeder pipe (39), being distributed evenly in the filter plate (F) and drum (21) by way of distribution funnel (35). Under centrifugal inertial force, the solid particles are sedimentated in the drum, and under the centrifugal pressure the filtrate passes through the filter cloth (48), sieve (49) and slotted hole plate (50), then it is gathered through holes (55) in the passages (51), and enters into chamber (26) by way of opening (52) and corresponding orifices located on pushing disk (28) and pressed plate (56). Through radial opening (22) on the revolving drum, it goes to the middle-case (37), and is drained away from the drain pipe (36).

When suspensions are added to the positional radius of the overflow pipe (29), the suspensions flow from overflow pipe (29) into the circular fluid receiver (20) right to the wall plate (19), then passing through the fluid discharging pipe (42) to transparent pipe (58), and as soon as the infrared sensor (59) is induced, signals are sent out to order the microcomputer (60) to stop the feeder valve (61) at once. At the time the circular radius of the suspensions is greater than the positional radius of the overflow pipe (29), the infrared sensor gives instantly an order to the microcomputer to let the feeder valve (61) continue supplying. It is repeated in such a manner until a cycle is finished, thus realizing an automatic harmonious feed.

After dewatering of the solid particles, the velocity of hydraulic motor decreases automatically according to the features of the solid particles, and oil is stopped to supply to the right chamber of cylinder (18), but it begins to supply oil from joint (15) to the left chamber of cylinder (18'), whereas piston (7) enables the set of pushing disks (27) to drive all filter particles axially to pass a drum length into the frontal case (40), and with the aid of the centrifugal inertial force, generated from whirling of pushing disk at low speed, the solid particles discharge automatically. A complete discharge and an absence of filter cake stored up on the filter medium allow the next cycle of filtration to maintain primary filtration speed and not to destroy crystals.

At this time, it is necessary to start the corresponding electromagnetic valve (not shown in the FIG.) to let the detergent (water, steam or solvent) go through the washing tube (43, 44, 45, 46, 47) to the corresponding for rinsing, if the middle case (37), frontal case (40), drum (21) and the set of pushing disks (27) etc. need to be washed. Having entered into the washing tube (43), the detergent passes the guide slot (25) and the axial opening (24) on the drum bottom (23), and enters into chamber (26) to wash the drum bottom and pushing disk. Washing tube (44) is used for rinsing the interior wall of middle case (37) and the external surface of the rotatable drum (21). Washing tube (45) rinses the the sides of radial filter plate (F) with pressurized water. The detergent of washing tube (46) flows firstly into cover plate frame (41) on the frontal case (40). The cover-plate frame is composed of two layers, upper and lower, being of the same curvature of the frontal case the upper layer is fixed on the case and it is linked with the lower layer by steel bones. There remains a certain space between the lower layer and the frontal case, as a result the detergent can flow from here to the frontal case (40). The detergent, flowed from washing tube (47) rinses the distribution funnel (35) and the radial filter plate (F), it can also make top washing. When radial filter plate (F) is washed, it may be repeatedly rinsed several times through washing tube (45), the solid particles are not stored up on the filter medium.

While washing is stopped, the directions of fluid movement flowed in the joints (15) and (16) are changed automatically. Then the set of pushing disks (27) and piston (7) return to the original position as shown in FIG. 1, the hydraulic motor moves at full speed, and after that the next cycle begins.

We claim:

1. An automatic lateral-filtration centrifuge comprising: means for filtration of suspensions containing fine sticky solid particles by centrifugal seperation including, a rotatable drum having an open top, a fluid-retaining wall and a bottom having a fluid exit;

means for rotating said drum;

a plurality of radial filter plates mounted substantially perpendicular to said bottom, said filter plates having means for channeling filtrate from said suspension to said fluid exit for avoiding buildup of filter cake on said drum walls; and means for applying said suspension to be filtered to said open top of said drum.

2. The centrifuge of claim 1 wherein said means for channeling comprises a slotted hole plate a sieve covering said plate and a filter cloth covering said sieve.

3. The centrifuge of claim 2 wherein said slotted hole plate comprises a plurality of horizontal guide slots crossing a plurality of vertical guide slots, said plate having orifices at points where said horizontal and said vertical slots cross.

4. The centrifuge of claim 3 wherein said sieve is a shutter sieve.

5. The centrifuge of claim 4 further comprising a pushing disk for driving said filtered particles axially to said open top of said drum.

6. The centrifuge of claim 1 further comprising an overflow pipe receiving excess suspension, a circular receiver receiving the output of said overflow pipe, a transparent pipe coupled to said receiver, an infrared sensor detecting presence of suspension in said transparent pipe, a microcomputer coupled to said sensor for receiving a signal indicating the presence of suspension in said transparent pipe, a controlled valve coupled to said microcomputer for stopping the flow of suspension into said centrifuge when suspension is in said transparent pipe.

* * * * *